(12) United States Patent
Kim et al.

(10) Patent No.: US 6,980,424 B2
(45) Date of Patent: Dec. 27, 2005

(54) ROTARY TYPE HINGE DEVICE FOR PORTABLE WIRELESS TERMINAL

(75) Inventors: Sang-Hyeon Kim, Taegukwangyok-shi (KR); Man-Young Park, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 10/731,169

(22) Filed: Dec. 10, 2003

(65) Prior Publication Data

US 2004/0141287 A1    Jul. 22, 2004

(30) Foreign Application Priority Data

Jan. 20, 2003    (KR) ...................... 10-2003-0003772

(51) Int. Cl.[7] ................................................ G06F 1/16
(52) U.S. Cl. ..................... 361/683; 455/557; 348/207
(58) Field of Search ................ 361/680–687; 455/90, 522, 557, 569, 550; 348/207, 552, 348/373–374; 364/708.1

(56) References Cited

U.S. PATENT DOCUMENTS 6,292,980 B1    9/2001   Yi et al. ...................... 16/303
6,798,132 B2 *  9/2004   Satake ........................ 313/495
6,812,958 B1 * 11/2004   Silvester .................. 348/207.1
6,813,146 B2 * 11/2004   Haraguchi et al. .......... 361/681
6,840,796 B2 *  1/2005   Marcinkiewicz et al. ... 439/495

* cited by examiner

*Primary Examiner*—Hung Van Duong
(74) *Attorney, Agent, or Firm*—Roylance, Abrams, Berdo & Goodman, L.L.P.

(57) ABSTRACT

Disclosed is a rotary type hinge device, which is rotatably coupled to a portable wireless terminal, especially to a body of the folder type terminal. The hinge device includes a first rotation axis for opening and closing operations of the terminal body and folder, and a second rotation axis extending perpendicular to the first rotation axis, thereby causing the folder to rotate about the second rotation axis in its opened state. By providing the hinge device of biaxial rotation type constructed as stated above, limitations in installation positions of a display device and camera lens can be removed, thereby improving the compatibility of the portable wireless terminal with respect to motion picture providing services, video communications and so on, so that it provides diversified mobile communication services. Further, the design and specification of the portable wireless terminal can be easily changed. Furthermore, the convenience in use of the portable wireless terminal can be increased since there is little variation in the opening and closing state of the portable wireless terminal whether the terminal is used as a phone mode or PDA mode.

27 Claims, 16 Drawing Sheets

ROTARY TYPE HINGE DEVICE FOR PORTABLE WIRELESS TERMINAL

PRIORITY

This application claims priority to an application entitled "ROTARY TYPE HINGE DEVICE FOR PORTABLE WIRELESS TERMINAL", filed in the Korean Industrial Property Office on Jan. 20, 2003 and assigned Ser. No. 2003-03772, the contents of which are hereby incorporated by reference.

BACKGROUND OF THE INVENTION

1. Field of the Invention

The present invention relates to a hinge device for a portable wireless terminal, and more particularly to a rotary type hinge device utilizing biaxial rotation, which enables the rotation of a folder, opened away from a terminal body of a portable wireless terminal, while rotating relative to the terminal body.

2. Description of the Related Art

Conventional portable wireless terminals can be categorized according to their shape. For example, there are bar type flip type and folder type terminals.

The bar type terminals comprise a main housing, data inputs and outputs and receiver and transmitter modules. In bar type terminals, there is a disadvantage in that the keypad, because it is used as data input, is always exposed, thereby causing it to malfunction. In addition, the bar type terminals are limited in their miniaturization due to required distance requirements between the receiver and transmitter modules.

Flip type terminals generally comprise a terminal body, a flip cover, and a hinge device adapted to rotatably couple the flip cover relative to the terminal body. The terminal body is mounted with data inputs and outputs and receiver and transmitter modules. The flip cover serves to cover the keypad when used as a data input, thereby preventing malfunctioning of the keypad, as described in reference to the bar type terminals. However, the flip type terminals are still limited in their miniaturization due to the required distance requirements between the receiver and transmitter modules.

The folder type terminals generally comprise a terminal body, a folder, and a hinge device adapted to rotatably couple the folder to the terminal body. The folder is adapted to be opened away from or closed to the terminal body according to its rotation. In a folded state, wherein the folder is in contact with the terminal body, the portable wireless terminal is in a call waiting mode, which prevents malfunctioning of the keypad when used for data input. When the folder is rotated and opened away from the terminal body, the portable wireless terminal is in a conversation mode, which ensures a sufficient minimum distance between transmitter and receiver modules. This configuration allows the portable wireless terminal, to be miniaturized. For these reasons, popularity of folder type terminals is increasing.

The hinge device provided in the flip type or folder type terminals is adapted to rotatably couple the flip cover or folder to the terminal body. However, if the flip cover or folder is opened away from the terminal body beyond a predetermined angle, the hinge device causes the flip cover or folder to be forced toward its open position without requiring any additional external force. Below the predetermined angle, the hinge device causes the flip cover or folder to be forced to come into close contact with the terminal body (i.e., closed).

The conventional hinge device for use in the flip type or folder type portable wireless terminals is disclosed in U.S. Pat. No. 6,292,980, issued to Yi, et al., the contents of which are incorporated herein by reference. The hinge device disclosed in said patent comprises a hinge cam and hinge shaft, which are formed with mountain-shaped portions or valley-shaped portions, respectively, and a hinge spring received in a hinge housing and adapted to urge the hinge cam to come into close contact with the hinge shaft. The hinge device is designed to open and close a flip cover or folder of a portable wireless terminal by means of circumferential curved surfaces of the mountain-shaped and valley-shaped portions and by the elastic force of the hinge spring.

Although mobile services have become increasingly diversified, and the number of functions the portable wireless terminals provide has increased, the conventional hinge device retains its function for simply causing the flip cover or folder of the portable wireless terminal to be opened away from, or closed to, the terminal body. The simple function and operation of the hinge device causes many limitations to modifying the specifications of the portable wireless terminal. For example, there are limitations in adding certain devices to the terminals for utilizing various other types of mobile services. In addition to the limitations of specification and design of the terminals, the conventional hinge device does not satisfy the aforementioned various mobile communication services' and customer's desires.

SUMMARY OF THE INVENTION

Therefore, the present invention has been made in view of the above problem, and it is an object of the present invention to provide a hinge device for a portable wireless terminal which is advantageous in allowing change of specification and design of the portable wireless terminal.

It is another object of the present invention to provide a hinge device for a portable wireless terminal which is able to satisfy diverse customers' tastes.

It is yet another object of the present invention to provide a hinge device for a portable wireless terminal, which enables the reversal of front and rear surfaces of a folder provided in the portable wireless terminal.

In accordance with one aspect of the present invention, the above and other objects can be accomplished by the provision of a rotary type hinge device for a portable wireless terminal, which is installed between a terminal body and a folder of the portable wireless terminal, the hinge device having a first rotation axis for opening and closing operations of the terminal body and folder and a second rotation axis extending perpendicular to the first rotation axis, and being adapted to cause the folder to rotate about the second rotation axis in a state wherein the folder and terminal body are opened. The hinge device comprises: a hinge housing rotatably coupled to the terminal body about the first rotation axis, the hinge housing being formed in a direction of the first rotation axis at a central region of an inner peripheral surface thereof with a pair of support brackets protruding to face each other, the support brackets defining a circumferentially extended support groove at the inner peripheral surface therebetween, and the hinge housing further being formed with a first opening for exposing the support brackets and support groove toward a direction of the second rotation axis. The hinge device further comprises a shaft frame unit formed with a fixing protrusion extended downwardly from a lower end thereof, which corresponds to the support groove, and at its inner surface around the lower end with a seating recess having a certain depth, the shaft frame unit defining a cam hole in the direction of the first rotation axis when the fixing protrusion is fixed into the support groove, and the shaft frame unit further being formed at its upper end with a second opening for exposing the seating recess toward the direction of the second rotation axis. The hinge device also comprises a main shaft unit rotatably positioned in the seating recess at its one end, and supported by the second opening at a certain position, the main shaft unit being formed with a shaft cam adapted to rotate about the second rotation axis within the cam hole of the shaft frame unit, and a coil spring received in one side of the hinge housing and adapted to provide a certain elastic force to the shaft cam of the main shaft unit.

In accordance with another aspect of the present invention, there is provided a rotary type hinge device for a portable wireless terminal, which is installed between a terminal body and a folder of the portable wireless terminal, the hinge device having a first rotation axis for opening and closing operations of the terminal body and folder and a second rotation axis extending perpendicular to the first rotation axis, and being adapted to cause the folder to rotate about the second rotation axis in a state wherein the folder and terminal body are opened. The hinge device comprises a hinge housing rotatably coupled to the terminal body about the first rotation axis, the hinge housing being formed in a direction of the first rotation axis with a first opening, which extends from a central region of its outer peripheral surface to a side region adjacent to one end thereof and is adapted to expose a part of an inner peripheral surface thereof, wherein the one end of the hinge housing constitutes an opened end formed with a perforated hole. The hinge device further comprises a main shaft unit rotatably coupled into the inner peripheral surface at a central region in a longitudinal direction of the hinge housing through the first opening, wherein the main shaft unit has a shaft cam adapted to rotate about the second rotation axis within the hinge housing, a hinge shaft, rotatably received relative to the first rotation axis within the hinge housing and being formed at its one end with a hinge protuberance protruding outwardly through the perforated hole of the opened end so as to be fixed to the terminal body and at the other end thereof with a valley-shaped portion having a curved surface, a hinge cam, formed at its one end with a mountain-shaped portion coming into slidable contact with the valley-shaped portion and adapted to linearly reciprocate within the hinge housing in accordance with rotation of the hinge shaft, and a coil spring, interposed between the hinge cam and the shaft cam of the main shaft unit and adapted to provide an elastic force for causing the valley-shaped portion and mountain-shaped portion to come into close contact with each other and also to provide a specific elastic force to the shaft cam.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
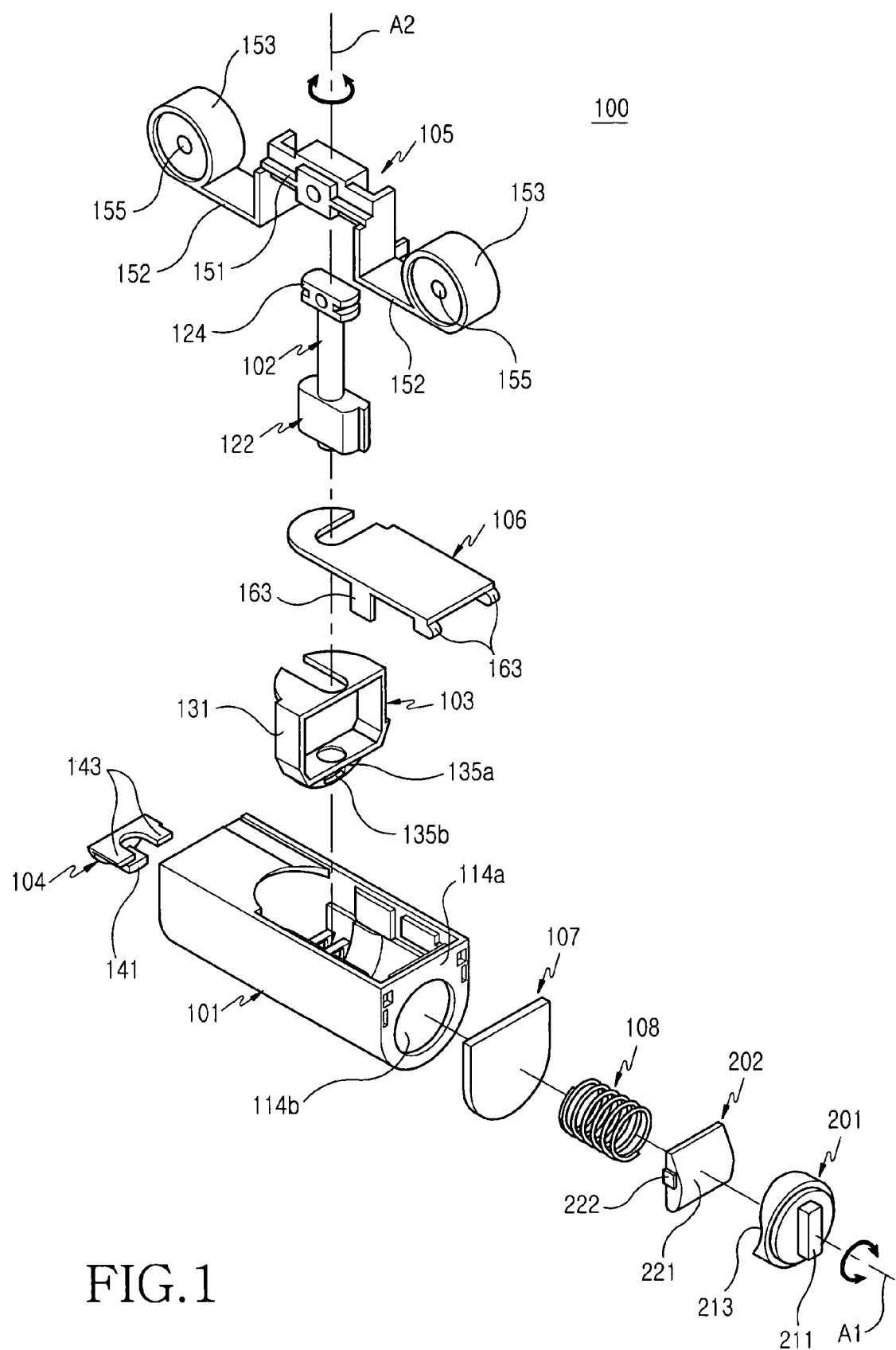
FIG. 1 is an exploded perspective view illustrating a rotary type hinge device for a portable wireless terminal in accordance with an embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it makes the subject matter of the present invention rather unclear. Also, the terms used in the following description are terms defined taking into consideration the functions obtained in accordance with the present invention. The definitions of these terms shall be determined based on the whole content of this specification because it can change in accordance with the option of a user or a usual practice.

FIG. 1 is an exploded perspective view illustrating a rotary type hinge device 100 of a portable wireless terminal in accordance with an embodiment of the present invention. As shown in FIG. 1, the rotary type hinge device 100 according to an embodiment of the present invention comprises a hinge housing 101, a main shaft unit 102, a holder 105, a hinge shaft 201, a hinge cam 202, a coil spring 108 and other components. The hinge device 100 is used to rotatably couple a folder to a body of the portable wireless terminal.

Figure 2:
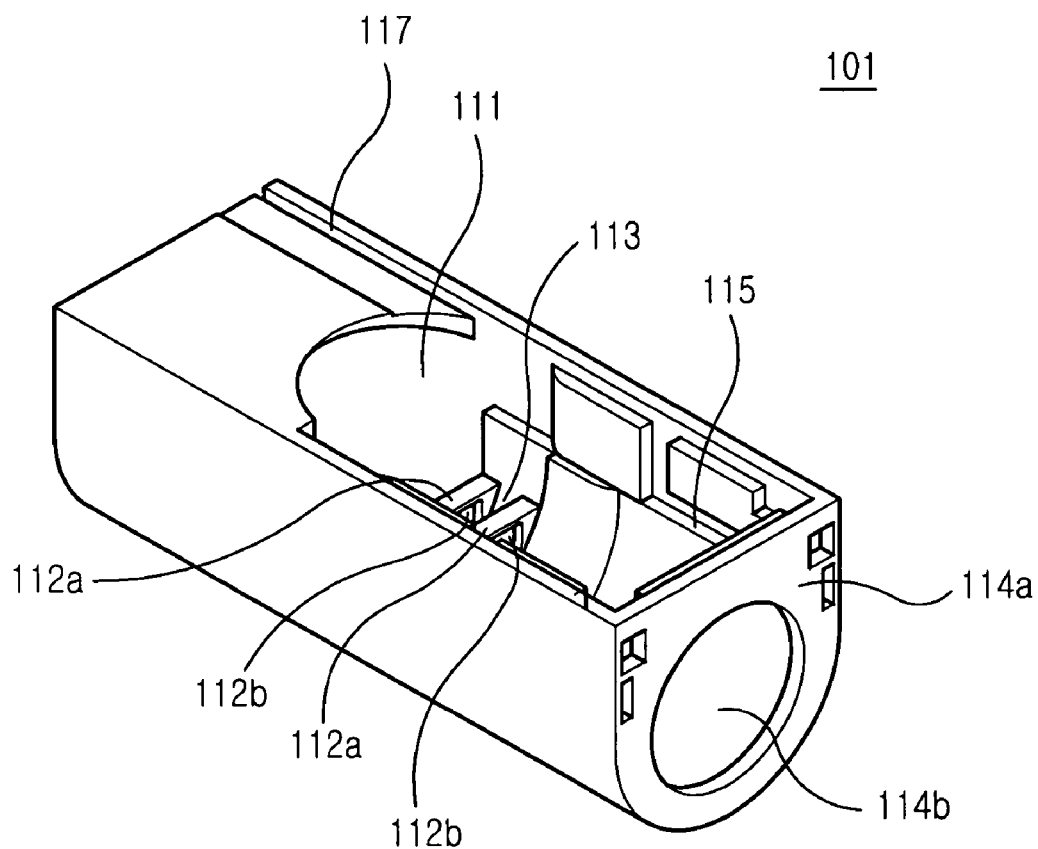
FIG. 2 is a perspective view illustrating a hinge housing of the hinge device shown in FIG. 1.

FIG. 2 is a perspective view illustrating the hinge housing 101 of the hinge device 100, which is configured to be inserted into a terminal body and adapted to rotate about a first rotation axis A1. The first rotation axis A1 is the opening and closing axis of the folder and terminal body of the portable wireless terminal. Referring to FIG. 2, the hinge housing 101 is formed with a first opening 111, which extends from the central region of its upper surface to the end region adjacent to one end thereof. The hinge housing 101 is also formed with a slit 117, which extends from the center region of the upper surface to the other end region adjacent to the other end thereof. The slit 117 serves to provide a passage channel of a flexible printed circuit 209 (shown in FIG. 17), which provides the electrical connection between the folder and the terminal body. The hinge housing 101 is provided at its inner peripheral surface with a pair of inwardly extended support brackets 112a, which are disposed in parallel to face each other at the longitudinal center region thereof. The parallel support brackets 112a define a circumferentially extended support groove 113 therebetween. Each support bracket 112a is formed with a first fixing hole 112b extended in a longitudinal direction of the hinge housing 101. The support brackets 112a and support groove 113 are adapted to be exposed to the outside through the first opening 111. In addition, the hinge housing 101 is formed with guide grooves 115 at the inner peripheral surface thereof. The guide groove 115 extends longitudinally from one of the support brackets 112a to the one end of the hinge housing 101. The one end of the hinge housing 101 constitutes an opened end 114a formed with a perforated hole 114b.

Figure 3:
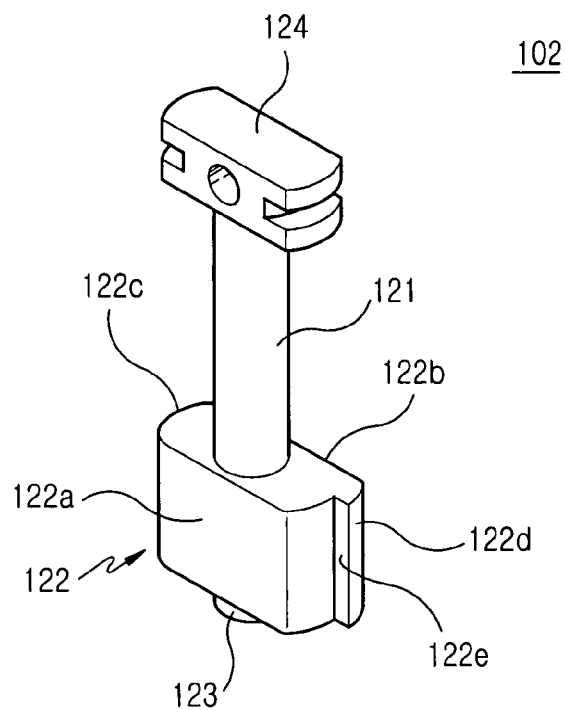
FIG. 3 is a perspective view illustrating a main shaft unit of the hinge device shown in FIG. 1.

FIG. 3 is a perspective view illustrating the main shaft unit 102 of the hinge device 100, which is coupled to the hinge housing 101 in such a fashion that it is rotatable about a second rotation axis A2 extending perpendicular to the first rotation axis A1. Referring to FIG. 3, the main shaft unit 102 includes a shaft 121, a specifically-shaped shaft cam 122 and a specifically-shaped fastening head portion 124. The shaft cam 122 is located on the shaft 121 adjacent to its lower end 123 so that the lower end 123 of the shaft 121 is protruded outwardly beyond the shaft cam 122, and the fastening head portion 124 is located at the opposite upper end of the shaft 121. The shaft cam 122 has first and second flat surfaces 122a and 122b formed at opposite sides thereof, a first curved surface 122c connecting respective one ends of the first and second flat surfaces 122a and 122b to each other at a distance from the second rotation axis A2, and a stopper 122d connecting respective other ends of the first and second flat surfaces 122a and 122b to each other at a distance from the second rotation axis A2. The distance between the curved surface 122c and second rotation axis A2 is shorter than the distance between the stopper 122d and second rotation axis A2. The stopper 122d serves to constraint the rotation range of the shaft cam 122. The fastening head portion 124 of the main shaft unit 102 is coupled to the holder 105, thereby allowing the holder 105 to rotate simultaneously with the main shaft unit 102. The holder 105 is coupled to the folder of the portable wireless terminal.

Figure 4:
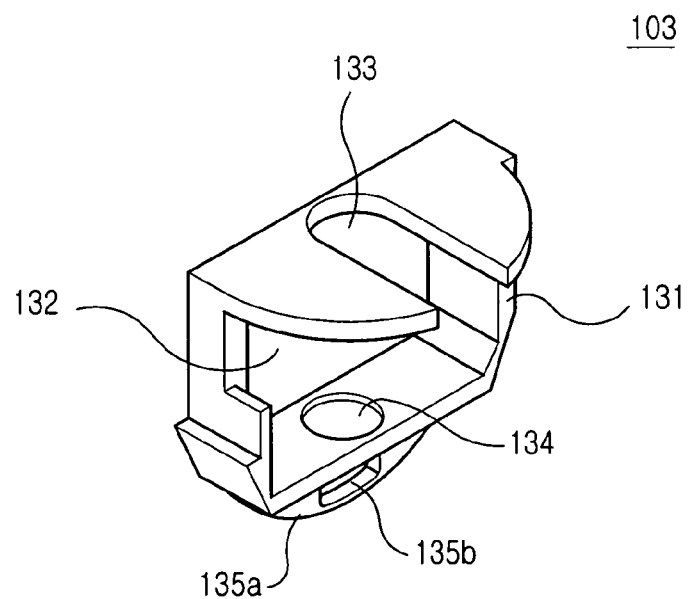
FIG. 4 is a perspective view illustrating a shaft frame unit of the hinge device shown in FIG. 1.

FIG. 4 is a perspective view illustrating a shaft frame unit 103 of the hinge device 100, which is used to rotatably couple the main shaft unit 102 to the hinge housing 101. Referring to FIG. 4, the shaft frame unit 103 includes a frame 131, a fixing protrusion 135a, and a second opening 133. The frame 131 defines a cam hole 132 in a direction of the first rotation axis A1 when it is coupled inside the hinge housing 101. In this coupled state, the fixing protrusion 135a, formed at the lower end of the frame 131, corresponds to the support groove 113 formed within the hinge housing 101. The second opening 133 extends in the direction of first rotation axis A1 from the one upper edge of the frame 131. The frame 131 is formed at its lower inner surface with a seating recess 134, into which the lower end 123 of the main shaft unit 102, especially the shaft 121, is to be rotatably positioned. The second opening 133 is adapted to support a certain position of the main shaft unit 102 with its end region, thereby causing the shaft cam 122 to rotate within the cam hole 132 of the shaft frame unit 103. The fixing protrusion 135a is formed with a second fixing hole 135b in the direction of the first rotation axis A1. In a state wherein the fixing protrusion 135a of the frame 131 is fitted into the support groove 113 of the hinge housing 101, the second fixing hole 135b communicates with the first fixing hole 112b formed in each of the support brackets 112a of the hinge housing 101.

Figure 5:
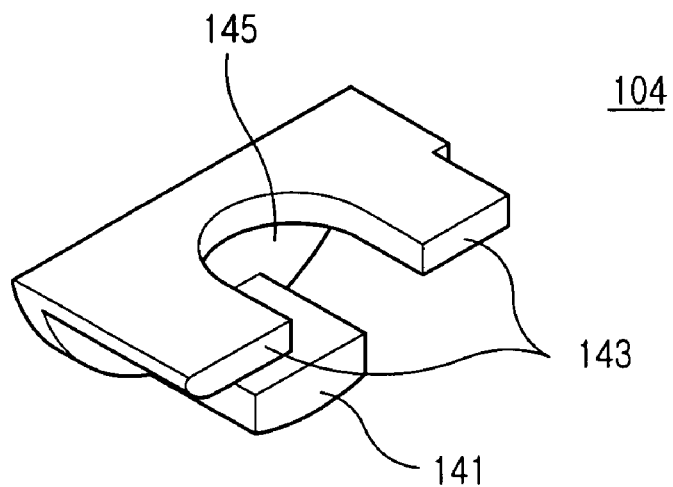
FIG. 5 is a perspective view illustrating a frame holder of the hinge device shown in FIG. 1.

FIG. 5 is a perspective view illustrating a frame holder 104 of the hinge device 100, which is a component for fixing the shaft frame unit 103 into the support groove 113 of the hinge housing 101. The frame holder 104 is formed at its lower end with a fixing pin 141 and at its upper end with a pair of support pins 143 extended in the same direction as the fixing pin 141. The fixing pin 141 is adapted to penetrate through the first fixing holes 112b and second fixing hole 135b, thereby fixing the shaft frame unit 103 to the hinge housing 101. The pair of support pins 143 define a certain opening 145 therebetween. The opening 145 serves to surround and support the lower end 123 of the main shaft unit 102 as well as to support the lower inner surface of the shaft frame unit 103. Therefore, the shaft frame unit 103 is fixed by the fixing pin 141 and, at the same time, supported by the support pins 143, thereby being maintained in its firmly fixed state.

Figure 6:
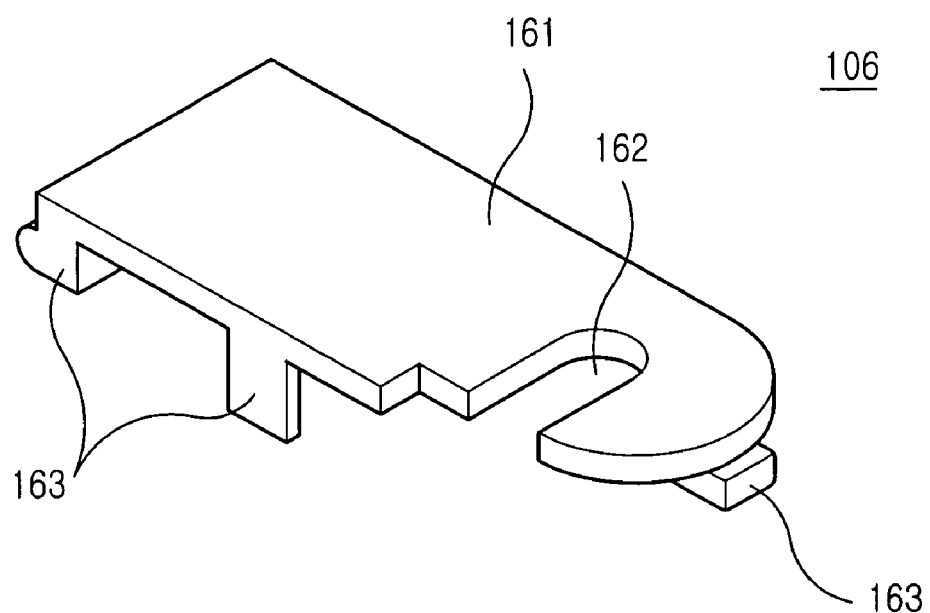
FIG. 6 is a perspective view illustrating a cover of the hinge device shown in FIG. 1.

FIG. 6 is a perspective view illustrating a cover 106 of the hinge device 100, which is adapted to be coupled into the first opening 111 of the hinge housing 101 in order to close the hinge housing 101. Referring to FIG. 6, the cover 106 includes a cover plate 161, a third opening 162, and a plurality of fastening pieces 163. The third opening 162 is positioned adjacent to the one end of the cover plate 161 so that it communicates with the second opening 133 of the shaft frame unit 103 when the cover 106 is coupled into the first opening 111. The second opening 133 extends in the direction of the first rotation axis A1, whereas the third opening 162 extends preferably in a different direction from the second opening 133. This allows the third opening 162 and second opening 133 to support the main shaft unit 102 from the different directions. When the cover 106 is coupled to the hinge housing 101, the third opening 162 extends perpendicular to the extending direction of the second opening 133.

Referring again to FIG. 1, the hinge housing 101, which is opened at the first opening 111, receives a hinge shaft 201, a hinge cam 202, a coil spring 108, and a washer plate 107 therein.

Figure 7:
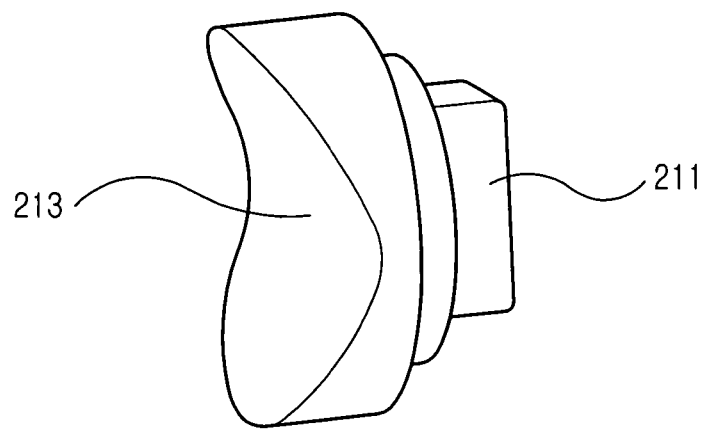
FIG. 7 is a perspective view illustrating a hinge shaft of the hinge device shown in FIG. 1.

FIG. 7 is a perspective view illustrating the hinge shaft 201, which is adapted to be rotatably received in the hinge housing 101. The hinge shaft 201 is formed at its one end with a hinge protuberance 211 and at its the other end with a valley-shaped portion 213. The hinge protuberance 211 is protruded outwardly through the perforated hole 114b of the hinge housing 101 at the open end 114a thereof, thereby being fixed to the terminal body of the portable wireless terminal.

Figure 8:
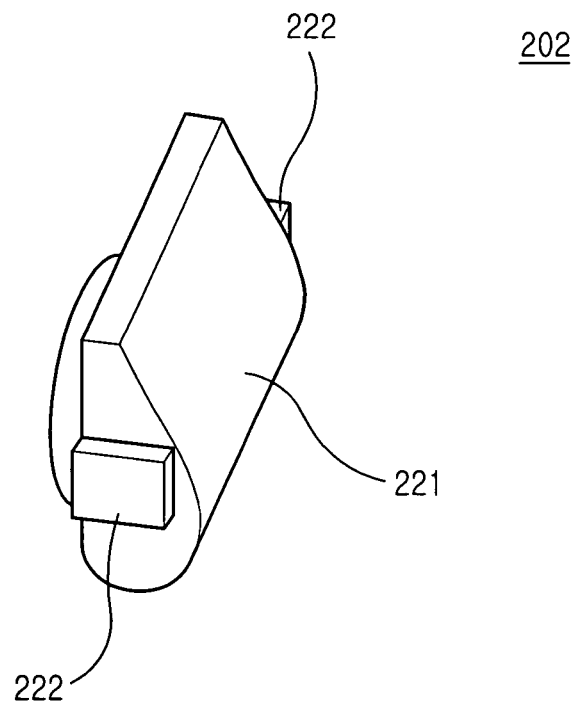
FIG. 8 is a perspective view illustrating a hinge cam of the hinge device shown in FIG. 1.

FIG. 8 is a perspective view illustrating the hinge cam 202, which is adapted to be received in the hinge housing 101 so as to linearly reciprocate therein. The hinge cam 202 is formed at its one end with a mountain-shaped portion 221 to come into slidable contact with the valley-shaped portion 213. In addition, the hinge cam 221 is formed at both side surfaces with guide protuberances 222, which correspond to the respective guide grooves 115, thereby guiding the linear reciprocating movement of the hinge cam 202.

Figure 9:
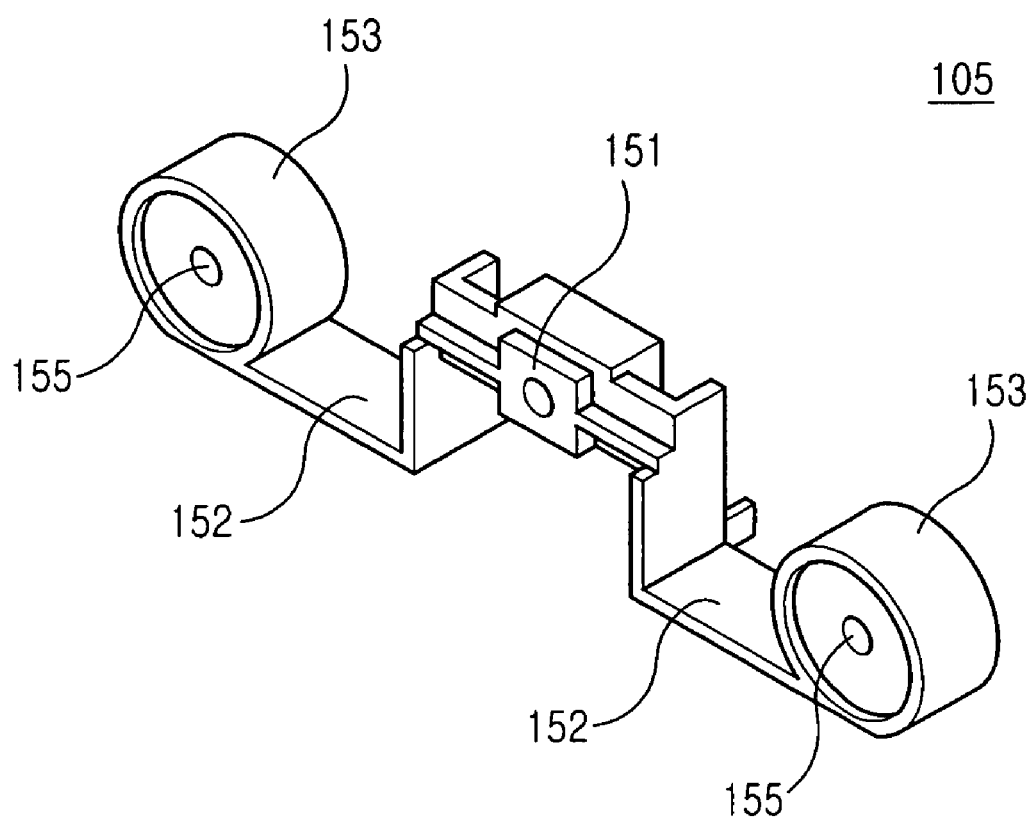
FIG. 9 is a perspective view illustrating a holder of the hinge device shown in FIG. 1.

FIG. 9 is a perspective view illustrating the holder 105 of the hinge device 100. The holder 105 includes a fixing portion 151 adapted to be fixed around the fastening head portion 124 formed at the upper end of the main shaft unit 102, a pair of folder arms 152 located at both ends of the fixing portion 151, and a pair of fastening portions 153 located at opposite ends of the respective folder arms 152. Each folder arm 152 extends perpendicularly downward from the end of the fixing portion 151, and then again extends outwardly in parallel to the fixing portion 151. Each fastening portion 153 is adapted to be fastened with the folder of the portable wireless terminal. The fastening portions 153 can be formed with screw holes 155, respectively.

Figure 10:
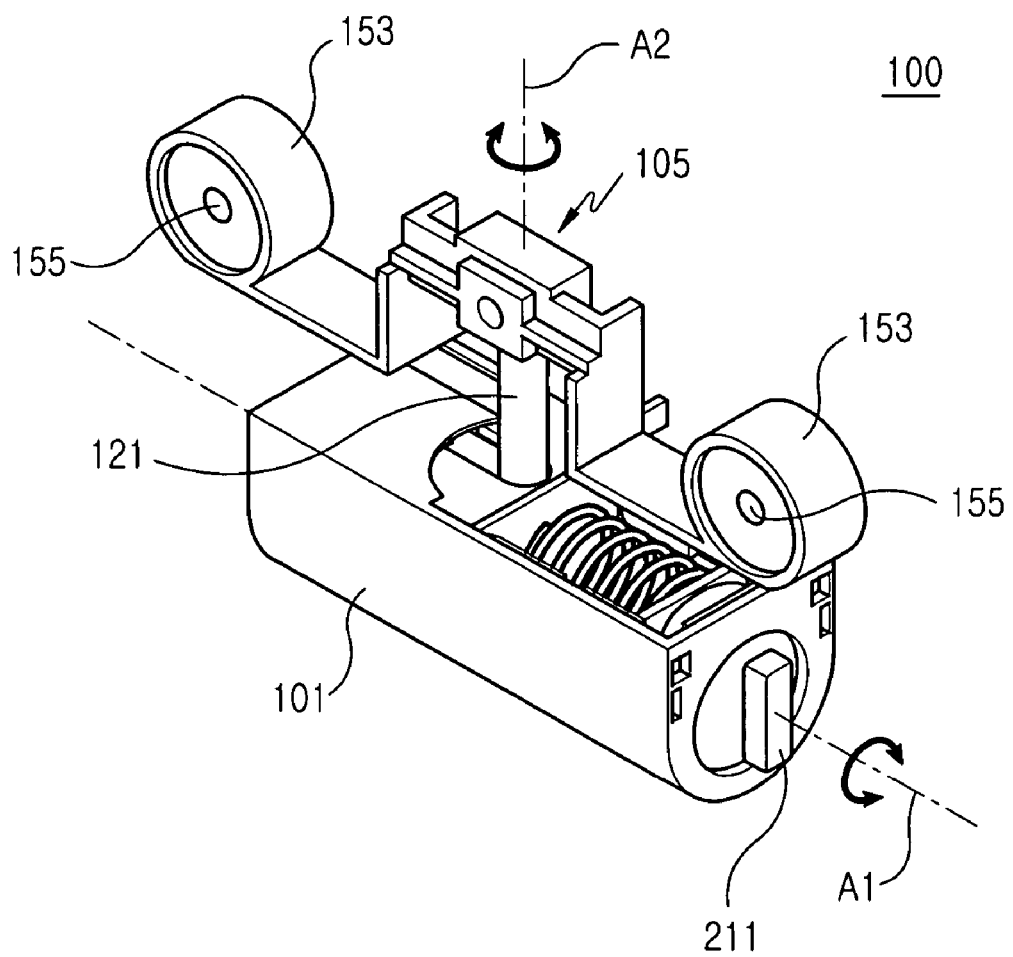
FIG. 10 is a perspective view illustrating an assembled state of the hinge device shown in FIG. 1.

FIG. 10 is a perspective view illustrating an assembled state of the hinge device 100 shown in FIG. 1. In the assembled state, shown in FIG. 10, the hinge protuberance 211 of the hinge shaft 201 protrudes outwardly from the one side of the hinge housing 101, and the holder 105 is fixed to the end of the shaft 121 of the main shaft unit 102, and upwardly protrudes out of the hinge housing 101.

FIGS. 11 to 15 are views explaining the operation of the hinge device 100. In FIGS. 12 to 15, the washer plate 107 is partially shown for a clearer description of the shaft cam 122.

Figure 11:
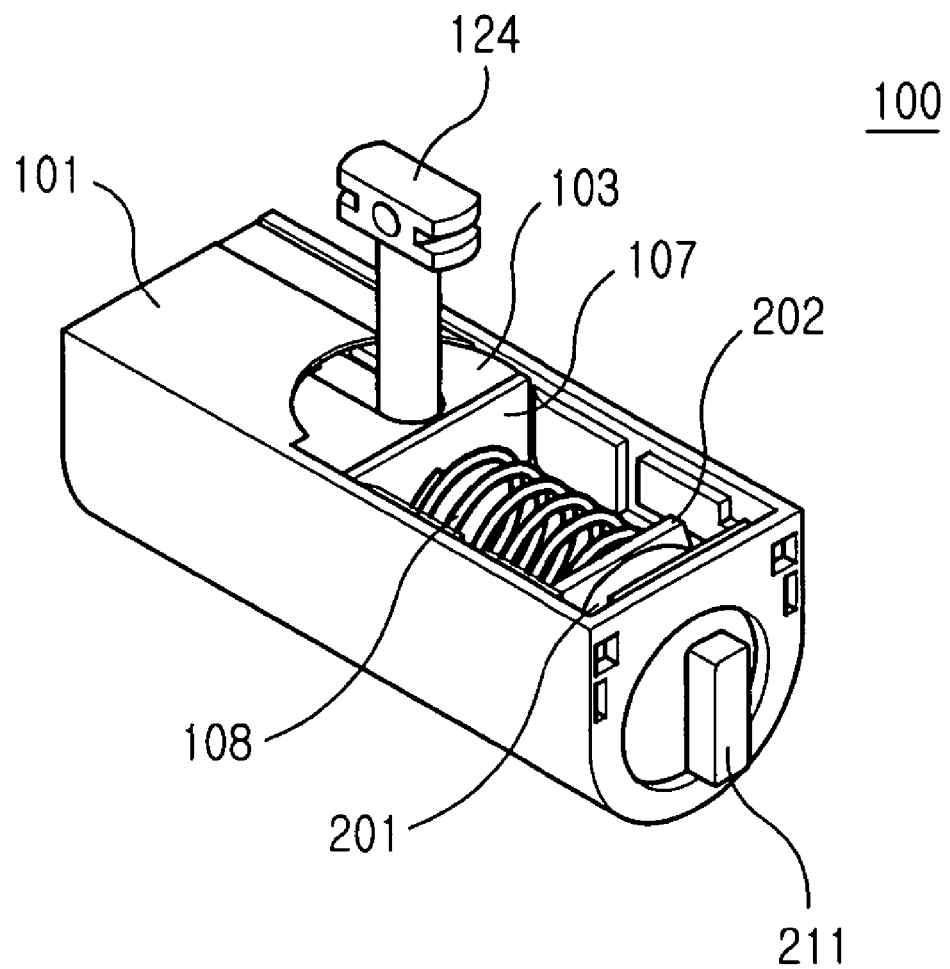
FIG. 11 is a perspective view illustrating an operational stationary state of the hinge device shown in FIG. 1.
Figure 12:
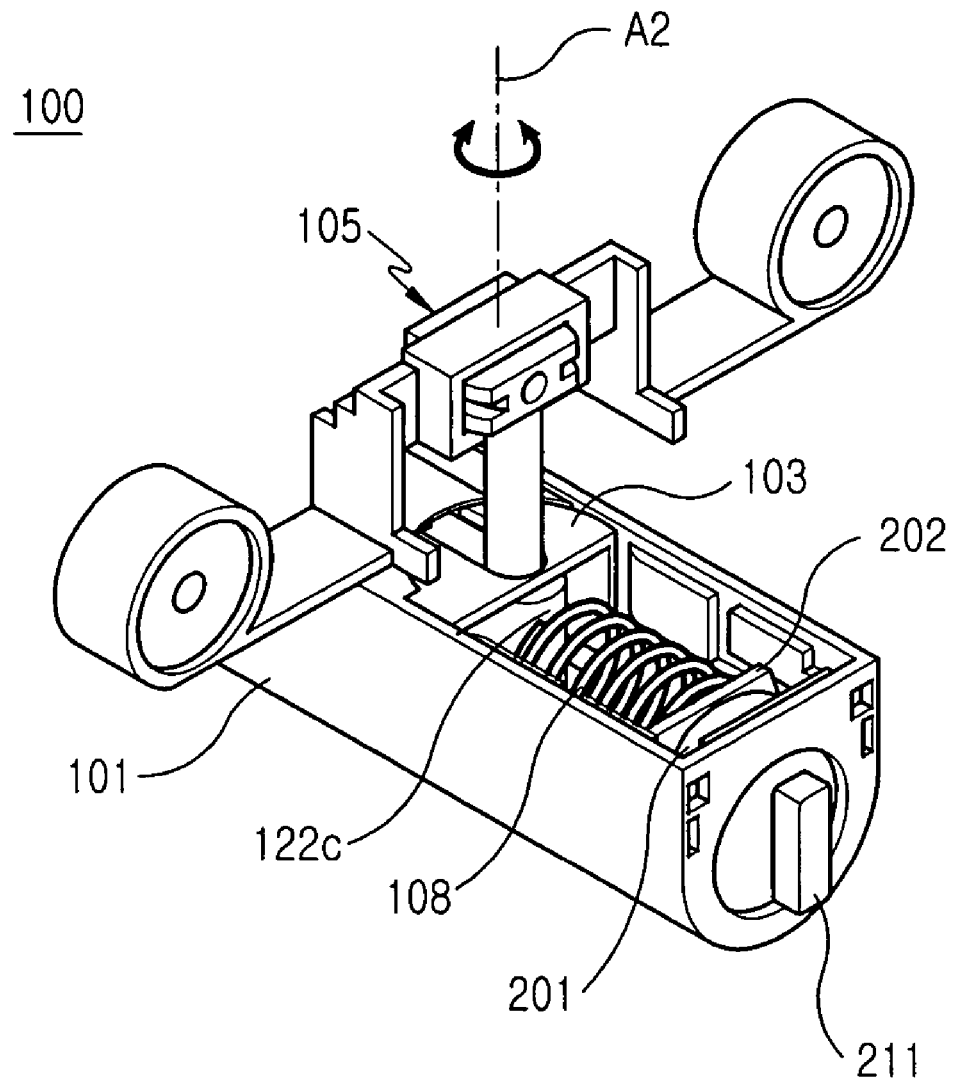
FIG. 12 is a perspective view illustrating a state wherein the holder of the hinge device shown in FIG. 1 is rotated at an angle of 90°.
Figure 13:
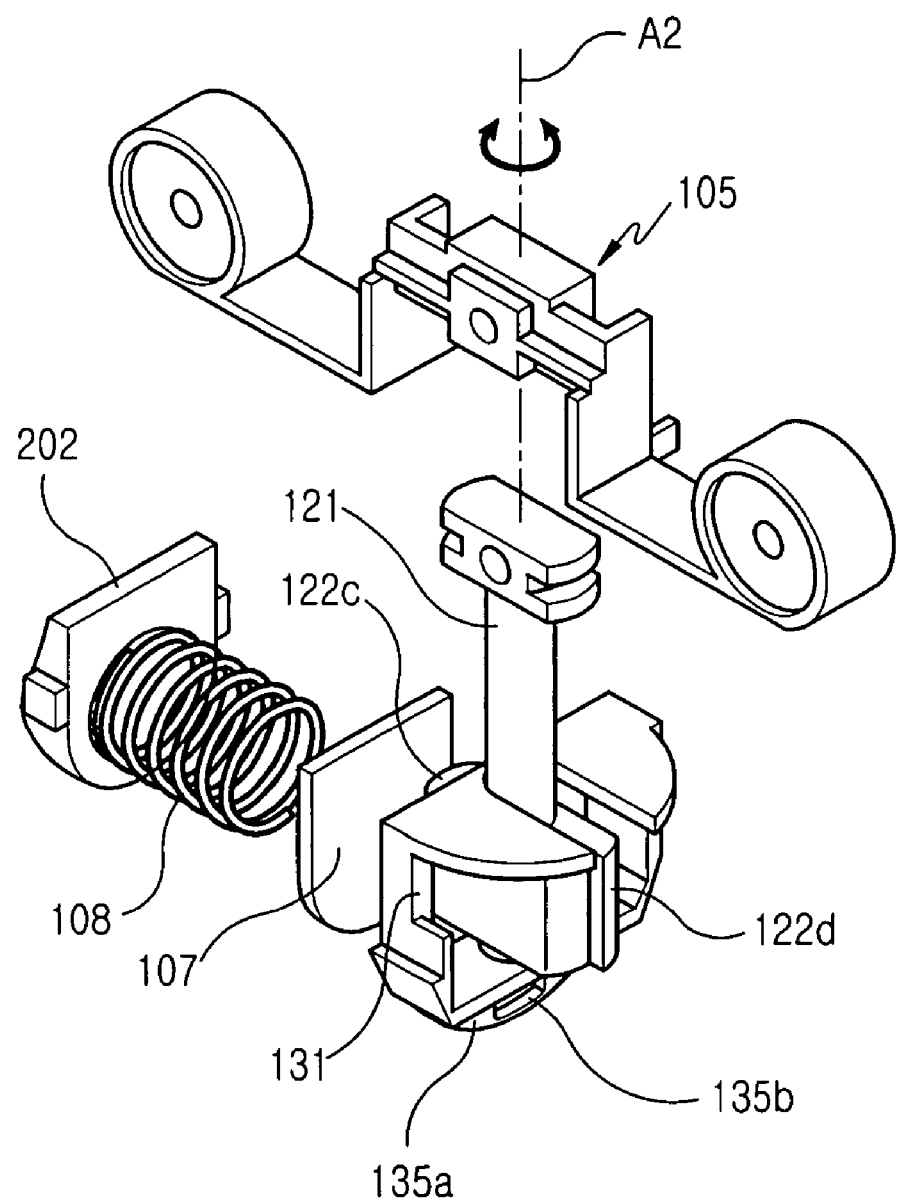
FIG. 13 is a perspective view illustrating a state wherein the holder of the hinge device shown in FIG. 1 is rotated at an angle of 45°.

Referring to FIG. 11, illustrating an operational stationary state of the hinge device 100, the shaft cam 122 is maintained in a stable stationary state with its first or second flat surface 122a or 122b facing the washer plate 107. This is possible due to the elastic force of the coil spring 108. Referring to FIGS. 12 and 13, the first curved surface 122c of the shaft cam 122 comes into slidable contact with the washer plate 107 (not shown) in accordance with the rotation of the main shaft unit 102. At this time, the coil spring 108 accumulates a certain elastic force therein. This accumulated elastic force urges the washer plate 107 to come into close contact with the shaft cam 122. When the main shaft unit 102 is rotated at an angle of or about 180°, the washer plate 107 again faces the second or first flat surface 122b or 122a, thereby causing the rotation of the main shaft unit 102 to be stopped. As described above, the stopper 122d of the shaft cam 122 is spaced apart from the second rotation axis A2 at a longer distance than the first curved surface 122c. This enables the shaft cam 122 to rotate in a direction such that only the first curved surface 122c, except the stopper 122d, comes into contact with the washer plate 107. The distance between the stopper 122d and second rotation axis A2, and the shape of the stopper 122d are designed so that the stopper 122d is engaged with the one side of the shaft frame unit 103, thereby constraining the rotation range of the shaft cam 122. Referring again to FIG. 3, the first flat surface 122a has a shorter width than that of the second flat surface 122b, and therefore the stopper 122d is formed with a stepped surface 122e at the first flat surface 122a. The rotation range of the shaft cam 122 is further constrained by adjusting the distance between the second rotation axis A2 and stopper 122d, so that the stepped surface 122e is engaged with one side of the shaft frame unit 103.

Figure 14:
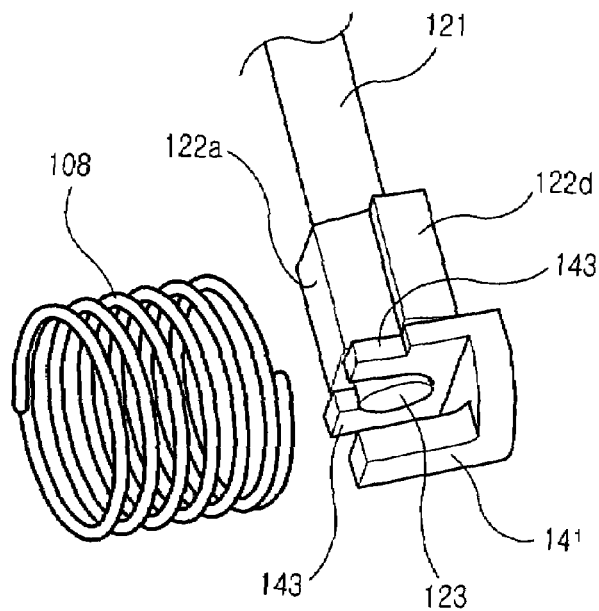
FIG. 14 is a perspective view explaining an assembled state of a shaft cam and coil spring of the hinge device shown in FIG. 1.

FIG. 14 illustrates a state wherein the first flat surface 122a of the shaft cam 122 faces the washer plate 107; however, washer plate 107 is not shown in FIG. 14. As shown in FIG. 14, the lower end 123 of the shaft 121 protrudes outwardly beyond the shaft cam 122, and is supported between the support pins 143 of the frame holder 104. The lower end 123 of the main shaft unit 102 is supported in one direction by the opening 145 defined between the support pins 143 of the frame holder 104. At the same time, the first or second flat surface 122a or 122b of the shaft cam 122 is supported by the washer plate 107, which is elastically supported by the coil spring 108. As a result, the shaft cam 122 is maintained in a stably rotatable state within the cam hole 132 of the shaft frame unit 103.

Figure 15:
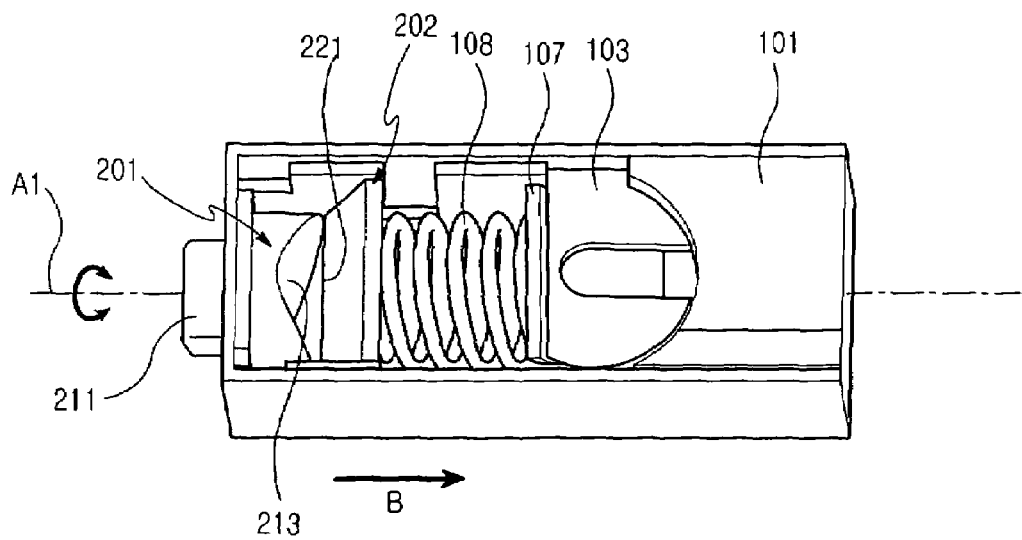
FIG. 15 is a perspective view explaining the operation of the hinge shaft and hinge cam of the hinge device shown in FIG. 1.

FIG. 15 is a perspective view explaining the operation of the hinge shaft 201 and hinge cam 202. As shown in FIG. 15, when the hinge shaft 201 is rotated about the first rotation axis A1, both apexes of the valley-shaped portion 213 face an apex of the mountain-shaped portion 221, thereby causing the hinge cam 202 to move in a direction of arrow B. At this time, the coil spring 108 accumulates a certain elastic force therein, urging the hinge shaft 201 and hinge cam 202 to come into close contact with each other. When the both apexes of the valley-shaped portion 213 and the apex of the mountain-shaped portion 221 intersect each other, the hinge cam 202 moves in the opposite direction of arrow B by the elastic force accumulated in the coil spring 108. This is possible since the hinge shaft 201 is rotated in a direction that the apexes of the valley-shaped portion 213 and mountain-shaped portion 221 face each other.

Consequently, the coil spring 108 provides the elastic force to the hinge shaft 201 rotating about the first rotation axis A1, and, at the same time, to the main shaft unit 102 rotating about the second rotation axis A2.

Figure 16:
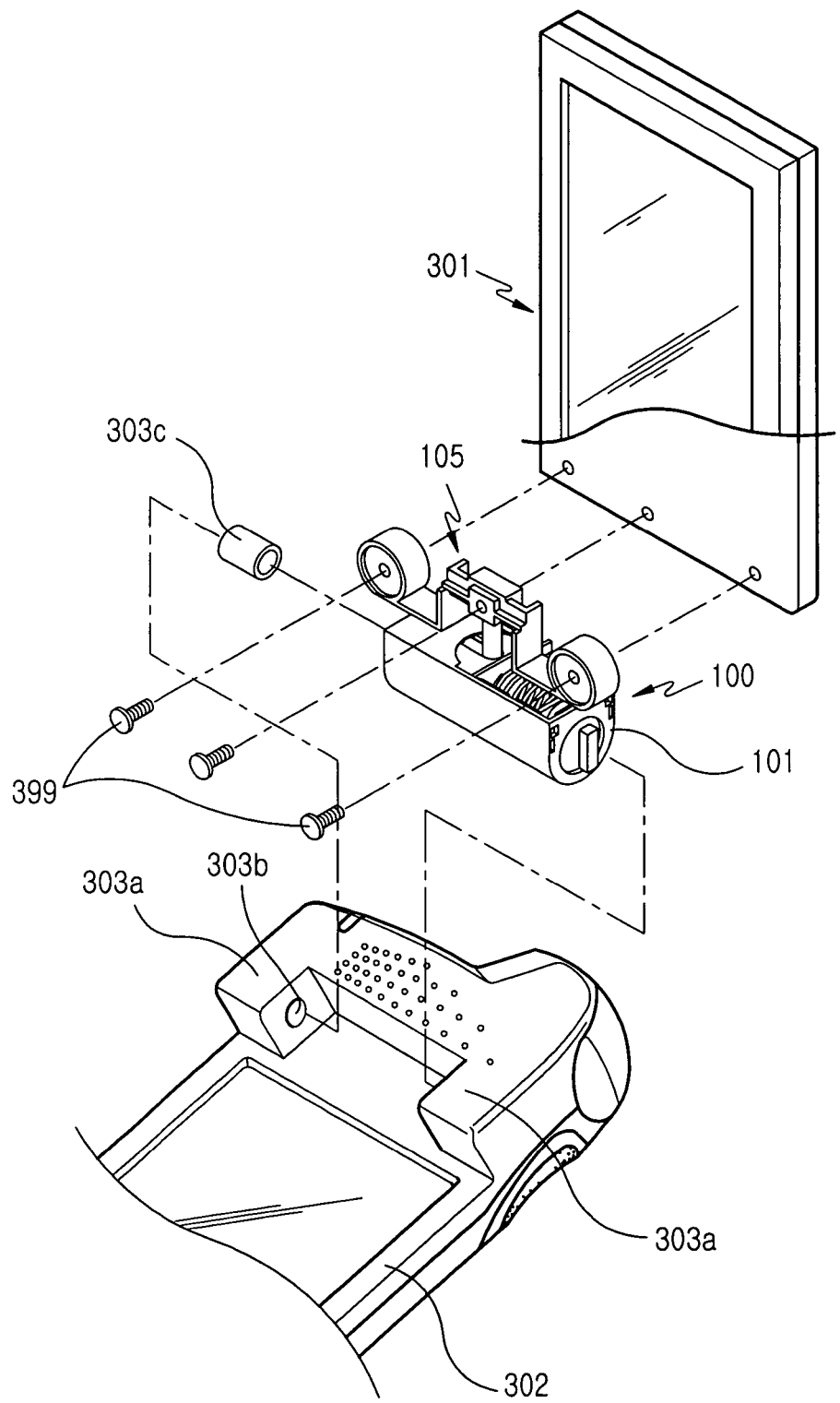
FIG. 16 is an exploded perspective view illustrating a coupling relation between the hinge device shown in FIG. 1 and the portable wireless terminal.

FIG. 16 is an exploded perspective view illustrating a state wherein the hinge device 100 shown in FIG. 1 is coupled to the portable wireless terminal. As shown in FIG. 16, the hinge device 100 is rotatably coupled between side hinge arms 303a of a terminal body 302 provided in the portable wireless terminal. One of the side hinge arms 303a is formed with a coupling hole (not shown), into which the hinge protuberance 211, protruding outwardly from the one end of the hinge housing 101, is to be coupled. The other end of the hinge housing 101 is coupled into a dummy hole 303b formed at the other hinge side arm 303a through a hinge dummy 303c. This will be explained in detail below. Meanwhile, the holder 105 is fastened to the one end of a folder 301 of the portable wireless terminal using screws 399 and the like.

Figure 17:
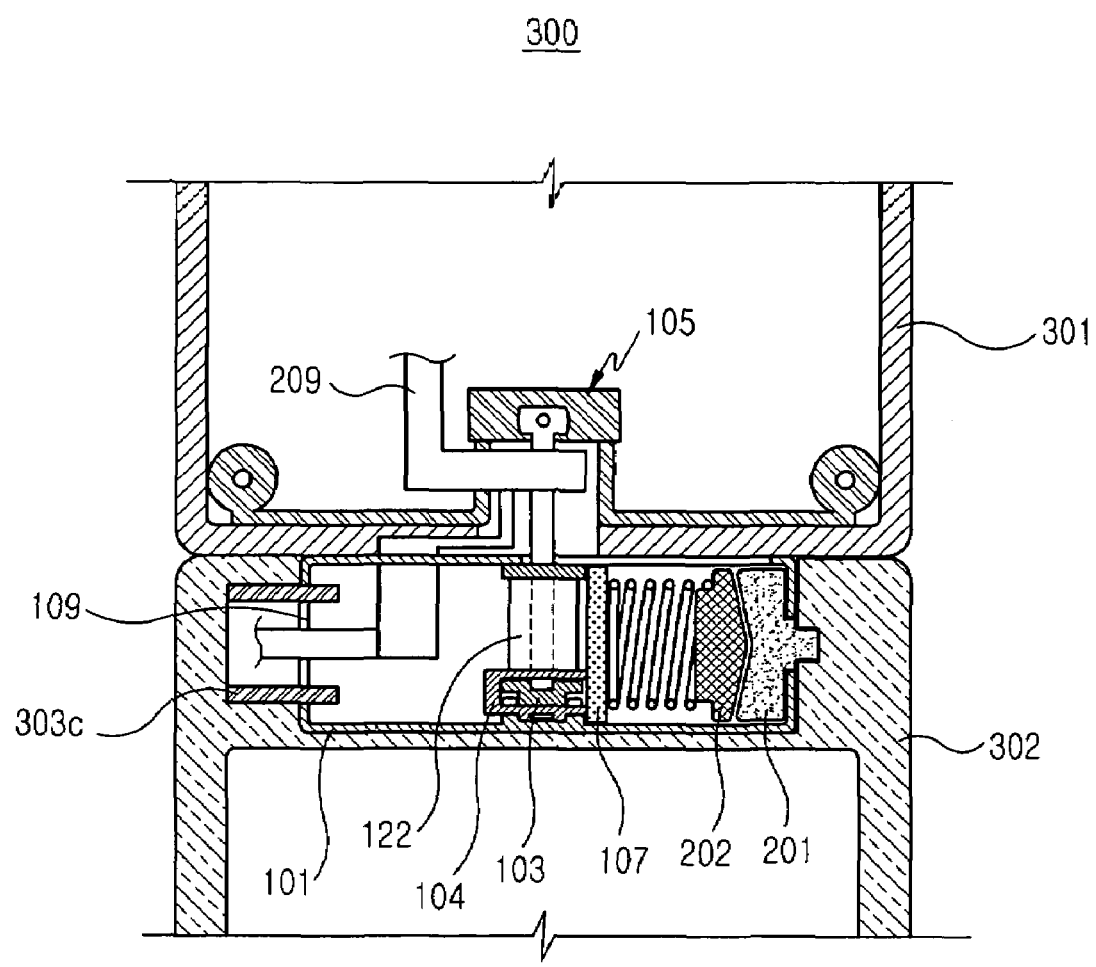
FIG. 17 is a sectional view illustrating a state wherein the hinge device shown in FIG. 1 is coupled to the portable wireless terminal.

FIG. 17 is a sectional view illustrating a state wherein the hinge device 100 shown in FIG. 1 is coupled to the portable wireless terminal. As shown in FIG. 17, the hinge protuberance 211 of the hinge shaft 201 is fixed inside one of the side hinge arms 303a, and the hinge dummy 303c is fixed inside the other one of the side hinge arms 303a while extending inwardly in the hinge housing 101.

The terminal body 302 is installed therein with a main board (not shown), and the folder 301 is installed therein with a display device (not shown). For the electrical connection between the main board and display device, the flexible printed circuit 209 is wired through the hinge device 100. The flexible printed circuit 209, connected to the display device of the folder 301, is wound at least two times around the main shaft unit 102 within the folder 301, and then is extended to the one side of the main shaft unit 102, thereby entering into the hinge housing 101 through its one end. The flexible printed circuit 209 is drawn through the other end of the hinge housing 101 and then connected to the main board mounted inside the terminal body 302. By winding the flexible printed circuit 209 around the main shaft unit 102, it is possible to prevent an excessive tension force from being applied to the flexible printed circuit 209 during rotation of the folder 301 in its opened state.

Figure 18:
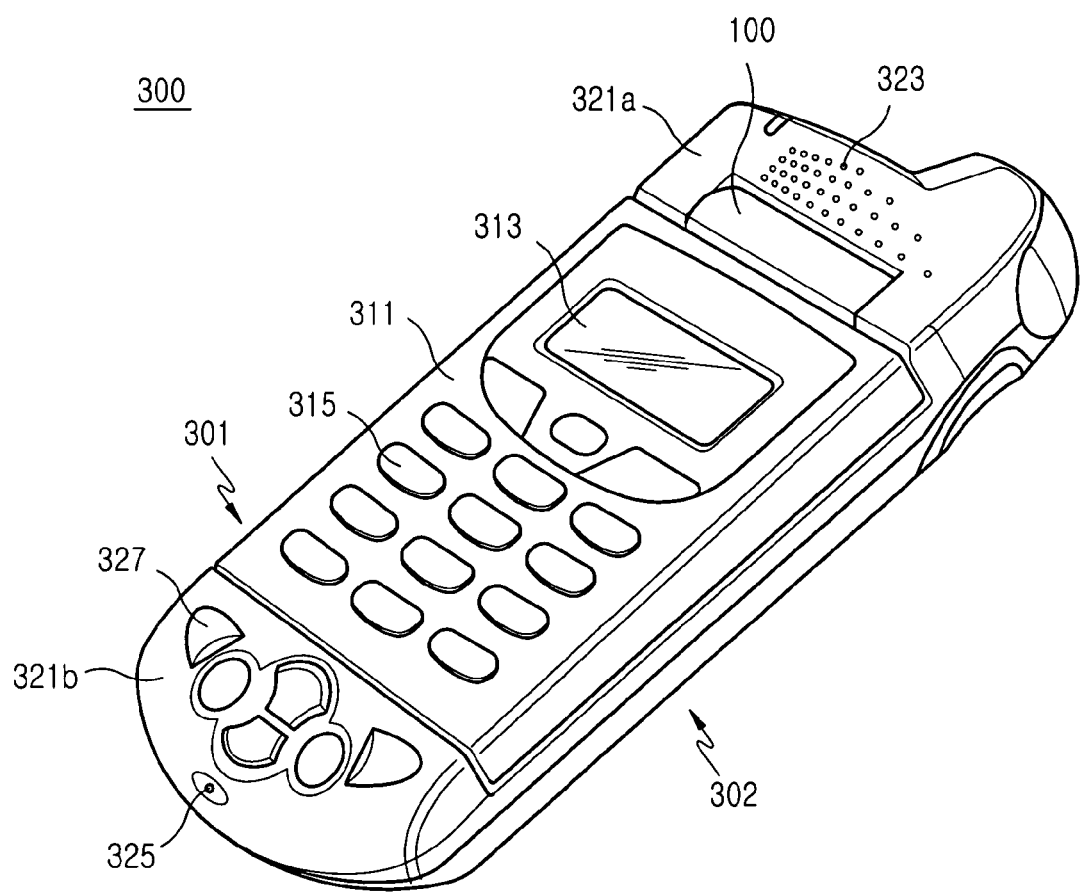
FIGS. 18 to 20 are perspective views, each illustrating the operation of the portable wireless terminal, in which the hinge device shown in FIG. 1 is applied.
Figure 19:
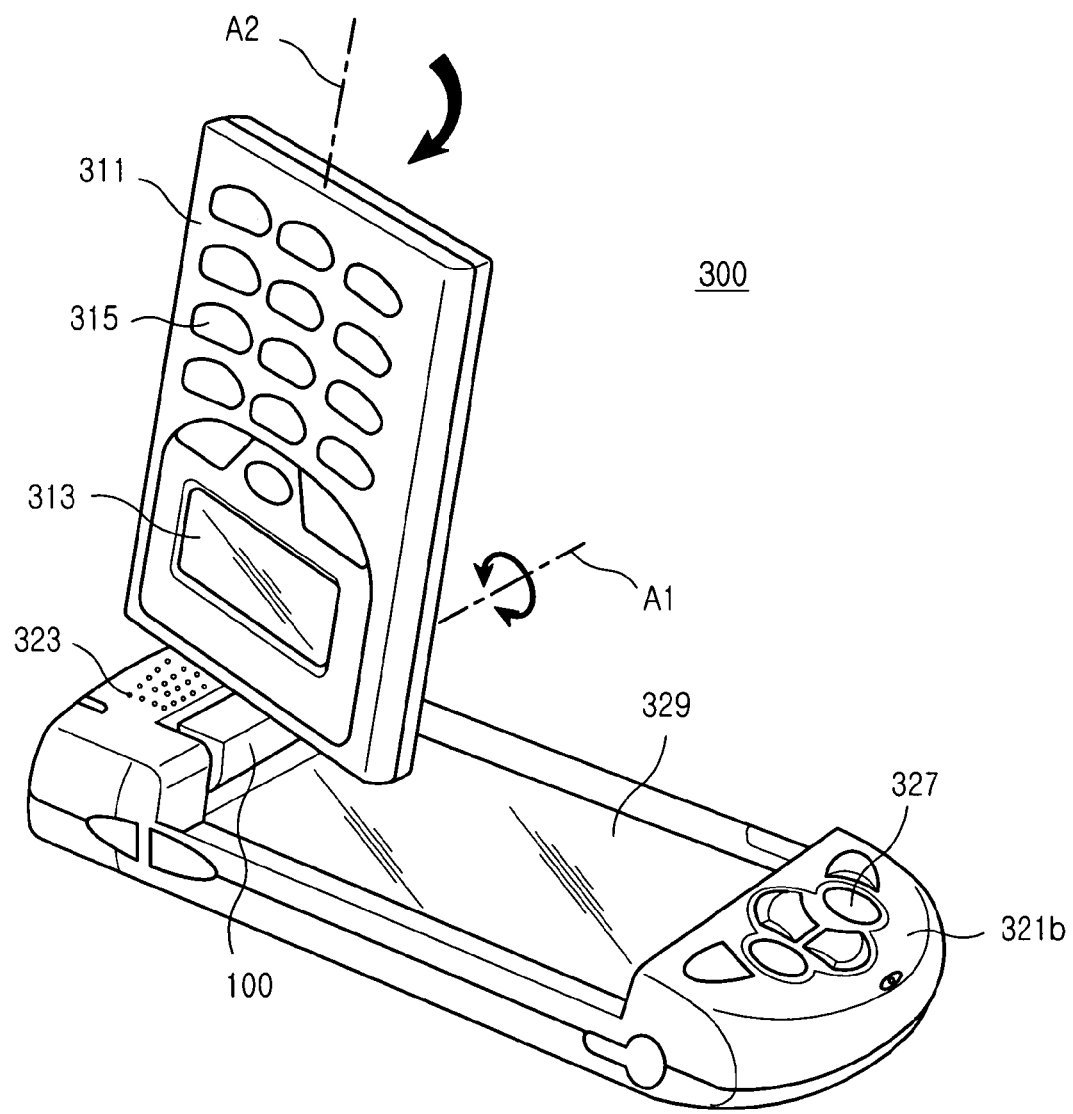
Figure 20:
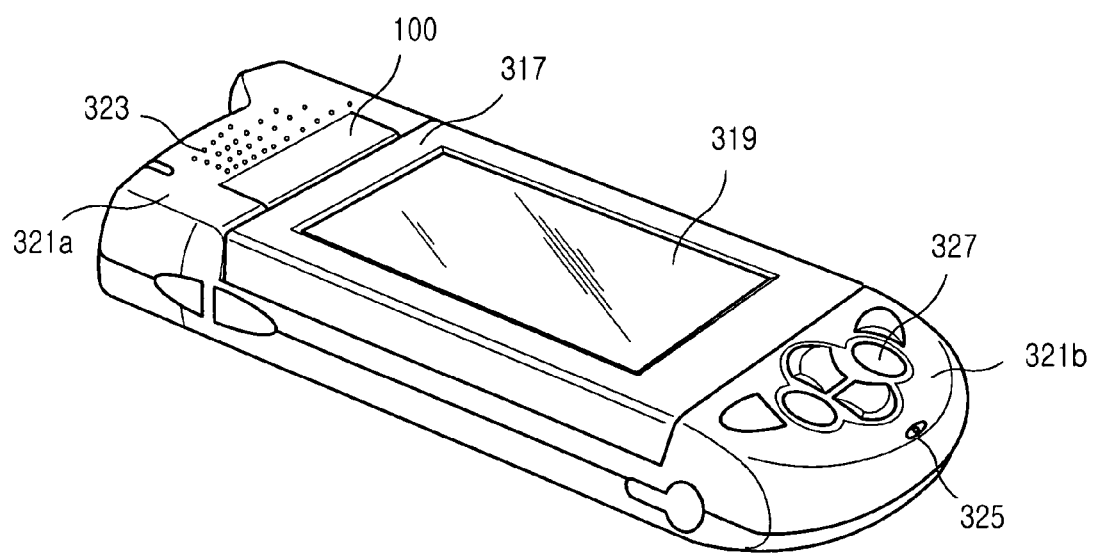

FIGS. 18 to 20 are perspective views, each illustrating the operation of the portable wireless terminal provided with the hinge device 100 shown in FIG. 1. As shown in FIGS. 18 to 20, the portable wireless terminal, designated as a reference numeral 300, comprises the terminal body 302 and folder 301, which are adapted to rotate their opening and closing positions by the hinge device 100.

The terminal body 302 is provided at its upper front surface 321a, adjacent to the upper end thereof, with a receiver 323, and at its lower front surface 321b, adjacent to the lower end thereof, with functional keys 327, and a transmitter 325. The terminal body 302 is formed with a folder receiving surface 329 between the upper and lower ends thereof.

The folder 301 is provided at its front main surface 311 with a first display device 313 and keypad 315, and at its rear surface 317 (shown in FIG. 20) with a second display device 319. The second display device 319 is structured as a touch screen, and is larger than that of the first display device 313.

In the state shown in FIG. 18, the portable wireless terminal 300 is shown in a portable phone mode, in which a user inputs a telephone number using the keypad 315 installed at the front main surface 311 of the folder 301.

FIG. 19 illustrates a state wherein the folder 301 is rotated about the second rotation axis A1 in its opened state. If the folder 301 is rotated about the first rotation axis A1, the hinge housing 101 of the hinge device 100 is rotated about the first rotation axis A1, thereby causing the folder 301 to be opened. Then, the folder 301 is can be rotated about the second rotation axis A2 in its opened state, thereby achieving the reversal of front main surface 311 with the rear surface 317 thereof. In this way, the folder 301 is operated in a biaxial rotation manner by means of the hinge device 100.

Referring to FIG. 20, the folder 301, with its front main surface 311 reversed with the rear surface 317, is rotated again about the first rotation axis A1, thereby being fitted into the folder receiving surface 329 of the terminal body 302. In this state, the portable wireless terminal 300 is used as a PDA terminal.

The second display device 319 of the portable wireless terminal 300 is configured to freely change its display direction. Therefore, if the portable wireless terminal 300 further comprises a camera lens and the like, the portable wireless terminal 300 can be used conveniently for image capturing and so on.

As apparent from the above description, the various embodiments of the present invention provide a rotary type hinge device for use in a portable wireless terminal, which enables the biaxial rotation of a folder, thereby allowing the front and rear surfaces of the folder to be easily reversed. As a result, limitations in installation positions of a display device and camera lens are removed, thereby improving the compatibility of the portable wireless terminal with respect to motion picture providing services, video communications and so on, in accordance with diversification of mobile communication services. In addition, according to the various embodiment of the present invention, the design and specification of the portable wireless terminal can be easily changed, and there is little variation in the opening and closing state of the portable wireless terminal whether the terminal is used in a phone PDA mode. This increases the convenience in use of the portable wireless terminal. Moreover, even if the folder of the terminal is rotated at various angles, it is possible to prevent damage to a flexible printed circuit providing the electrical connection between the folder and a terminal body.

Although certain embodiments of the present invention have been disclosed for illustrative purposes, those skilled in the art will appreciate that various modifications, additions and substitutions are possible, without departing from the scope and spirit of the embodiments of the invention as disclosed in the accompanying claims.

What is claimed is:

1. A rotary type hinge device for a portable wireless terminal, which is installed between a terminal body and a folder of the portable wireless terminal, the hinge device having a first rotation axis for opening and closing operations of the terminal body and folder and a second rotation axis extending perpendicular to the first rotation axis, and being adapted to cause the folder to rotate about the second rotation axis in a state wherein the folder and terminal body are opened, the hinge device comprising:

a hinge housing rotatably coupled to the terminal body about the first rotation axis, the hinge housing being formed in a direction of the first rotation axis at a central region of an inner peripheral surface thereof with a pair of support brackets protruding to face each other, the support brackets defining a circumferentially extended support groove at the inner peripheral surface therebetween, the hinge housing further being formed with a first opening for exposing the support brackets and support groove toward a direction of the second rotation axis;

a shaft frame unit formed with a fixing protrusion extended downwardly from a lower end thereof, which corresponds to the support groove, and at its inner surface around the lower end with a seating recess having a certain depth, the shaft frame unit defining a cam hole in the direction of the first rotation axis when the fixing protrusion is fixed into the support groove, the shaft frame unit further being formed at its upper end with a second opening for exposing the seating recess toward the direction of the second rotation axis;

a main shaft unit rotatably positioned in the seating recess at its one end, and supported by the second opening at a certain position, the main shaft unit being formed with a shaft cam adapted to rotate about the second rotation axis within the cam hole of the shaft frame unit; and a coil spring received in one side of the hinge housing and adapted to provide a certain elastic force to the shaft cam of the main shaft unit.

2. The rotary type hinge device as set forth in claim 1, wherein the shaft cam comprises:

first and second flat surfaces formed on opposite sides thereof;

a first curved surface connecting respective one ends of the first and second flat surfaces to each other at a distance from the second rotation axis; and a stopper connecting respective opposite ends of the first and second flat surfaces to each other at a farther distance from the second rotation axis than the first curved surface, and adapted to constrain a rotating range of the shaft cam.

3. The rotary type hinge device as set forth in claim 1, wherein:

each of the pair of support brackets is formed with a first fixing hole in the direction of the first rotation axis, respectively, and the fixing protrusion of the shaft frame is formed with a second fixing hole encountering the first fixing holes; and the hinge device further comprises a frame holder having a fixing pin adapted to penetrate through the first and second fixing holes to be coupled therethrough, and a pair of support pins extended in parallel to the fixing pin and adapted to support the end of the main shaft unit located in the seating recess of the shaft frame unit and also adapted to support an inner surface around a lower end of the shaft frame unit, wherein the frame holder serves to firmly maintain a fixed state of the shaft frame unit between the support pins and fixing pin thereof.

4. The rotary type hinge device as set forth in claim 1, wherein:
the main shaft unit is protruded at the other end thereof out of the hinge housing through the second opening; and
the hinge device further comprises a holder to be fixed to one end of the folder, the holder being adapted to rotate about the second rotation axis while being coupled to the other end of the main shaft unit, the holder having fastening portions provided at respective opposite ends of a pair of folder arms extended outwardly in opposite directions.

5. The rotary type hinge device as set forth in claim 1, wherein:
the first opening of the hinge housing is extended further toward the one side of the hinge housing, thereby providing an assembly space of the coil spring; and
the hinge device further comprises a cover for supporting the main shaft unit, the cover being fixed to the first opening, thereby closing it and coming into close contact with an upper end surface of the shaft frame unit, the cover being formed with a third opening communicating with the second opening.

6. The rotary type hinge device as set forth in claim 2, wherein the main shaft unit is stopped in rotation under a state wherein the first flat surface or second flat surface of the shaft cam faces one end of the coil spring.

7. The rotary type hinge device as set forth in claim 2, wherein the stopper comes into contact with one side of the shaft frame unit to constrain the rotation of the shaft cam in a state wherein the first flat surface faces the coil spring, and also comes into contact with the coil spring to constrain the rotation of the shaft cam in a state wherein the second flat surface faces the coil spring, whereby the shaft cam being adapted to rotate within a range of 180°.

8. The rotary type hinge device as set forth in claim 2, further comprising a washer plate between the shaft cam and the one end of the coil spring, which is adapted to come into slidable contact with the first curved surface during the rotation of the shaft cam.

9. The rotary type hinge device as set forth in claim 8, wherein the shaft cam is stopped in rotation under a state wherein the first flat surface or second flat surface of the shaft cam faces the washer plate.

10. A rotary type hinge device for a portable wireless terminal, which is installed between a terminal body and a folder of the portable wireless terminal, the hinge device having a first rotation axis for opening and closing operations of the terminal body and folder and a second rotation axis extending perpendicular to the first rotation axis, and being adapted to cause the folder to rotate about the second rotation axis in a state wherein the folder and terminal body are opened, the hinge device comprising:
a hinge housing rotatably coupled to the terminal body about the first rotation axis, the hinge housing being formed in a direction of the first rotation axis with a first opening, which extends from a central region of its outer peripheral surface to a side region adjacent to one end thereof and is adapted to expose a part of an inner peripheral surface thereof, the one end of the hinge housing constituting an opened end formed with a perforated hole;
a main shaft unit rotatably coupled into the inner peripheral surface at a central region in a longitudinal direction of the hinge housing through the first opening, the main shaft unit having a shaft cam adapted to rotate about the second rotation axis within the hinge housing;
a hinge shaft rotatably received relative to the first rotation axis within the hinge housing, the hinge shaft being formed at its one end with a hinge protuberance protruding outwardly through the perforated hole of the opened end so as to be fixed to the terminal body and at the other end thereof with a valley-shaped portion having a curved surface;
a hinge cam formed at its one end with a mountain-shaped portion coming into slidable contact with the valley-shaped portion and adapted to linearly reciprocate within the hinge housing in accordance with rotation of the hinge shaft; and
a coil spring interposed between the hinge cam and the shaft cam of the main shaft unit and adapted to provide an elastic force for causing the valley-shaped portion and mountain-shaped portion to come into close contact with each other and also to provide the certain elastic force to the shaft cam.

11. The rotary type hinge device as set forth in claim 10, wherein the shaft cam comprises:
first and second flat surfaces formed on opposite sides thereof;
a first curved surface connecting respective one ends of the first and second flat surfaces to each other at a distance from the second rotation axis; and
a stopper connecting respective opposite ends of the first and second flat surfaces to each other at a farther distance from the second rotation axis than the curved surface, and adapted to constrain a rotating range of the shaft cam.

12. The rotary type hinge device as set forth in claim 10, wherein:
the hinge housing is formed in the direction of the first rotation axis at a center region of the inner peripheral surface thereof with a pair of support brackets protruding to face each other, the support brackets defining a circumferentially extended support groove at the inner peripheral surface therebetween, the support brackets and support groove being adapted to be exposed to the outside in a direction of the second rotation axis through the first opening; and
the hinge device further comprises a shaft frame unit formed with a fixing protrusion extended downwardly from a lower end thereof, which corresponds to the support groove, and at its inner surface around the lower end with a seating recess having a certain depth, the shaft frame unit defining a cam hole in the direction of the first rotation axis when the fixing protrusion is fixed into the support groove, the shaft frame unit further being formed at its upper end with a second opening for exposing the seating recess toward the direction of the second rotation axis, wherein the main shaft unit is rotatably positioned in the seating recess at its one end and supported by the second opening at a certain position, and the shaft cam of the main shaft unit is adapted to rotate within the cam hole of the shaft frame unit.

13. The rotary type hinge device as set forth in claim 10, wherein:
the main shaft unit is protruded at the other end thereof out of the hinge housing through the second opening; and
the hinge device further comprises a holder to be fixed to one end of the folder, the holder being adapted to rotate about the second rotation axis while being coupled to the other end of the main shaft unit, the holder having fastening portions provided at respective opposite ends of a pair of folder arms extended outwardly in opposite directions.

14. The rotary type hinge device as set forth in claim 10, wherein the hinge housing is formed with at least one guide groove extended longitudinally at the inner peripheral surface thereof, and the hinge cam is formed at an outer peripheral surface thereof with at least one guide protuberance corresponding to the guide groove, thereby guiding linear reciprocating movements of the hinge cam.

15. The rotary type hinge device as set forth in claim 11, wherein the shaft cam is stopped in rotation under a state wherein the first flat surface or second flat surface of the shaft cam faces the coil spring.

16. The rotary type hinge device as set forth in claim 11, further comprising a washer plate between the shaft cam and the one end of the coil spring, which is adapted to come into slidable contact with the first curved surface during the rotation of the shaft cam.

17. The rotary type hinge device as set forth in claim 12, wherein:
each of the pair of support brackets is formed with a first fixing hole, and the fixing protrusion of the shaft frame is formed with a second fixing hole encountering the first fixing holes; and
the hinge device further comprises a frame holder having a fixing pin adapted to penetrate through the first and second fixing holes to be coupled therethrough, and a pair of support pins extended in parallel to the fixing pin and adapted to support the end of the main shaft unit located in the seating recess of the shaft frame unit and also adapted to support an inner surface around a lower end of the shaft frame unit, wherein the frame holder serves to firmly maintain a fixed state of the shaft frame unit between the support pins and fixing pin thereof.

18. The rotary type hinge device as set forth in claim 12, further comprising:
a cover for supporting the main shaft unit, the cover being fixed to the first opening, thereby closing it and coming into close contact with an upper end surface of the shaft frame unit, the cover being formed with a third opening communicating with the second opening.

19. The rotary type hinge device as set forth in claim 13, wherein the portable wireless terminal further comprises a flexible printed circuit for electrical connection between the terminal body and folder, the flexible printed circuit being wound at least one time around the main shaft unit between the holder and hinge housing.

20. The rotary type hinge device as set forth in claim 16, wherein the shaft cam is stopped in rotation under a state wherein the first flat surface or second flat surface of the shaft cam faces the washer plate.

21. A method for operating a portable wireless terminal which comprises a rotary type hinge device for a portable wireless terminal, which is installed between a terminal body and a folder of the portable wireless terminal, wherein said hinge device has a hinge housing coupled to the terminal body about a first rotation axis and includes a circumferentially extending support groove, and a shaft frame unit having a fixing protrusion member received in the support groove, the shaft frame unit having a cam member and a main shaft rotatable about a second rotation axis, the main shaft being coupled to the folder and rotatably coupled to the hinge housing, and a spring within the hinge housing to apply a biasing force against the cam member on the main shaft, the method comprising:
opening and closing the terminal body and folder about the first rotation axis;
rotating the folder and main shaft about the second rotation axis in a state wherein the folder and terminal body are opened, wherein the second rotation axis extends transverse to the first rotation axis.

22. The method for operating a portable wireless terminal according to claim 21, further comprising:
rotating the folder about the first axis, causing the folder to be opened, wherein the folder includes a front main surface and a rear main surface;
rotating the folder about the second axis, causing a reversal of the front main surface with the rear main surface; and
rotating the reversed folder about the first axis, thereby fitting the folder into the terminal body such that the portable wireless terminal can be used in a first mode.

23. The method of claim 21, wherein
said hinge device includes a hinge housing rotatably coupled to the terminal body about the first rotation axis, the hinge housing having a pair of support brackets forming the support groove and a first opening receiving the main shaft unit.

24. The method of claim 21, further comprising
biasing the cam member and the main shaft to a selected rotational position with respect to the hinge housing.

25. The method for operating a portable wireless terminal according to claim 22, wherein the first mode comprises a PDA terminal mode.

26. The method for operating a portable wireless terminal according to claim 22, further comprising:
a display device and camera lens, thereby providing motion picture services and video communications.

27. The method for operating a portable wireless terminal according to claim 22, wherein the rotation of the folder about the first and second axis prevents damage to a flexible printed circuit providing electrical connection between the folder and terminal body.

* * * * *